United States Patent Office 3,277,182
Patented Oct. 4, 1966

3,277,182
ORGANO-CALCIUM COMPOUNDS
Gottfried Pampus and Heinz Grone, Leverkusen, and Josef Witte, Cologne-Stammheim, Germany, assignors to Farbenfabriken Bayer Aktiengesellschaft, Leverkusen, Germany, a corporation of Germany
No Drawing. Original application Nov. 17, 1960, Ser. No. 69,843, now Patent No. 3,163,630, dated Dec. 29, 1964. Divided and this application Apr. 29, 1964, Ser. No. 363,606
Claims priority, application Germany, Nov. 25, 1959, F 29,928
8 Claims. (Cl. 260—612)

This is a division of application Serial No. 69,843, filed November 17, 1960, and now Patent No. 3,163,630.

The present invention relates to the polymerization of conjugated diolefines by means of catalysts, comprising organo-calcium compounds, as well as to new organo-calcium compounds which are suitable as catalysts for the polymerization of olefinically unsaturated monomers.

The use of alkali metals or alkaline earth metals as catalysts for the polymerization of conjugated diolefines, for example those of the butadiene series, has long been known. The polymerization of conjugated diolefines with such metallic catalysts does, however, present considerable technical processing difficulties, which are caused primarily by long and different periods of latency and also by the fact that the polymerization often starts violently and the progress thereof is difficult to control. Consequently, this process has only occasionally been able to acquire a certain degree of importance, for example, for the production of polybutadiene with sodium or a sodium/potassium alloy.

It has also already been proposed to use organometallic compounds as polymerization catalysts. For example, German Patent No. 255,786 describes the polymerization of conjugated diolefines to rubber-like substances by means of organometallic compounds of the alkali metals and alkaline earth metals, special complex compounds of sodium alkyls and zinc dialkyls being disclosed. The process of this patent specification also does not provide a solution which can be exploited industrially. This is inter alia attributed to the fact that the physical and also technological properties of the polymers, thereby obtained, did not satisfy the standards which are required of elastomers which are used industrially.

It is furthermore known that the physical and technological properties of polymeric diolefines are substantially influenced by the structure of these polymers. Particularly valuable properties are shown by those polymers which comprise a homogeneous or at least substantially regular structure. One example of this type which has long been known is provided by natural rubber, the most important constituent of which is substantially uniform 1,4-cis-poly-2-methyl butadiene. Because of its structural features, natural rubber combines such a number of valuable physical and technological properties that even today it is still of outstanding technical importance.

Practically all known metallic and organometallic catalysts cause diolefines to polymerize to polymers with a more or less irregular structure, which is of no particular industrial interest. It is known that catalysts based on lithium or organic lithium compounds lead to polymers with substantially homogeneous structure, under certain conditions, when polymerizing diolefines, more especially 2-methyl butadiene. Nevertheless, the technical processing difficulties, which already have been mentioned above, arise when metallic lithium is used as catalyst. A further obstacle is the high reactivity of lithium with respect to nitrogen, which necessitates working in an inert gas atmosphere. Organic lithium compounds certainly show an appreciably better behaviour in this respect, but generally yield polymers of considerably lower molecular weights, which cannot be considered for use in rubber industry. In order to obtain polymers of a sufficiently high molecular weight and thus also adequate physical and technological properties, the concentration of the catalytically active organic lithium compound must be kept extremely low. However, this on the other hand sets very high standards as regards the degree of purity of the monomeric olefines, and these can only be satisfied at considerable expense. Furthermore, in view of the very small quantities of catalyst, traces of foreign substances, such as air, moisture and the like, lead to considerable disturbances in the polymerization reaction.

It has now been found that conjugated diolefines, especially those of the butadiene series, can be polymerized without any of the aforementioned difficulties to provide products of high molecular weight, by using catalysts which contain an organic calcium compound as essential constituent. It is possible in this way to obtain polymers which are of high molecular weight and show a substantially uniform structure, more especially as regards their steric structure and as regards branchings, for example when 2-methyl-butadiene is used as monomer. This discovery was surprising as the organometallic compounds of other alkaline earth metals, for example of zinc or magnesium, have only a low catalytic efficacy and only produce a poor yield of polymers of low molecular weights. In contrast thereto, the polymerization is achieved in a few hours with practically quantitative yields, even at room temperature, when using catalysts based on organic calcium compounds. A particular advantage of the catalysts according to the invention, compared with the organic lithium compounds, is that they have a substantially lesser "regulating" action and consequently yield polymers of high molecular weight also with higher catalyst concentrations.

It has also been found that not only conjugated diolefines, but also other vinyl compounds, can be polymerized with the catalysts according to the invention, by themselves or admixed with one another and also in admixture with conjugated diolefines.

Catalytically active compounds in accordance with the present invention are quite generally organic calcium compounds with at least one calcium-carbon bond, more especially those which conform to the general Formula I (I) 

In this formula $R_1$ and $R_2$ each can represent alkyl having 1 to 20 carbon atoms, cycloalkyl, aralkyl or aryl radicals. Furthermore, the radicals $R_1$ and $R_2$ can be like or different and they can also carry hetero atoms, advantageously oxygen, nitrogen or halogen atoms, in the form of substituents, or oxygen or nitrogen atoms in the form of chain or ring members.

The following are examples of representatives of this type of compound: calcium diphenyl, calcium phenyl butyl, calcium phenyl ethyl, calcium phenyl propyl, calcium phenyl isobutyl, calcium phenyl strearyl, calcium dibenzyl, calcium phenyl cyclohexyl, calcium phenyl-2-ethyl propyl, calcium butyl-(2-N,N'-dimethylamino-ethyl) and calcium phenyl allyl.

For the preparation of such organic calcium compounds, the known reaction of suitable organometallic compounds with calcium can be used. For example, calcium diethyl and calcium diphenyl, respectively, can be prepared from zinc diethyl or mercury phenyl and metallic calcium in an inert solvent.

However, it is preferred to use a new type of calcium compounds which are obtained by reacting organic calcium halides of the general formula (II) $\quad\quad\quad R_1\text{—Ca—}X$ with organic alkali metal compounds of the general formula:

(III) $\quad\quad\quad (Me)_n\text{—}R_2$

In these formulae, $R_1$ and $R_2$ each represent an aliphatic radical having 1 to 20 carbon atoms, cycloaliphatic, araliphatic or aromatic radicals. The radicals $R_1$ and $R_2$ can in this case also be like or different and they can carry hetero atoms, preferably oxygen, nitrogen or halogen atoms in the form of substituents, or oxygen or nitrogen atoms in the form of chain or ring members. Furthermore, X represents a halogen atom such as chlorine, bromine, or iodine, preferably bromine or iodine, and Me represents an alkali metal, such as lithium, sodium or potassium, preferably lithium, and $n$ stands for a whole integer of 1 to 4.

Contrary to experience met in reactions with analogous components, there is no deposition of metal halides in this case. Rather are there obtained compounds of obviously complex nature which in many cases have substantially better solubility in organic solvents (such as ethers and aromatic hydrocarbons), than the starting products.

It has also been found that the preparation of the new organic calcium compounds can be carried out in the presence of additional alkali metal or alkaline earth metal halides, without the solubility of the organic calcium compounds in solvents such as ethers or aromatic hydrocarbons being appreciably reduced thereby. On the contrary, it is even possible considerably to improve the solubility of the organic calcium compound by such an addition of an alkali metal or alkaline earth metal halide. In contrast thereto, it was to be expected that the presence of alkali metal or alkaline earth metal halides would have a salting-out effect on the basis of the solubility product.

The organic calcium compounds to be prepared according to the invention are not simple mixtures, but are new complex compounds of defined composition, the properties of which differ considerably from those of the initial substances. For example, it is not possible for lithium butyl to be separated out from the compound $$\text{Li·Ca}(C_6H_5)(C_4H_9)\text{I}$$

by washing or extraction by means of an aliphatic or cycloaliphatic hydrocarbon. Similarly, it is not possible to split up the complexes into their starting components by fractional precipitation or by recrystallization from inert solvents.

The organic calcium halides of the composition (II) $\quad\quad\quad R_1\text{—Ca—}X$ are obtained in a manner corresponding to the Grignard compounds of similar structure from metallic calcium and halogenated hydrocarbons. Suitable organic calcium halides are for example calcium phenyl iodide, calcium tolyl bromide, calcium naphthyl iodide, calcium methyl iodide, calcium ethyl bromide, calcium propyl iodide, calcium butyl bromide, calcium stearyl iodide and calcium cyclohexyl bromide.

Suitable organic alkali metal compounds of the formula (III) $\quad\quad\quad (Me)_n\text{—}R_2$ are by way of example: sodium amyl, sodium phenyl, potassium phenyl, lithium methyl, lithium ethyl, lithium butyl, lithium dodecyl, lithium stearyl, lithium cyclohexyl, lithium phenyl, lithium tolyl, lithium, o-methoxy phenyl, lithium chlorophenyl, tetramethylene dilithium, hexamethylene dilithium, 1,5-dilithium naphthalene, 1,2-dilithium diphenyl propane, 1,3,5-trilithium pentane, 1,3-5-trilithium benzene, phenyl isopropyl potassium etc. It is also possible to use the addition products of alkali metals such as sodium and lithium with polynuclear aromatic hydrocarbons such as naphthalene, anthracene.

Suitable alkali metal or alkaline earth metal halides, in the presence of which the said organic calcium compound can be prepared, are for example the chlorides, bromide or iodides of lithium, sodium, potassium, calcium etc.

The reactions for producing said new calcium compounds are generally carried out in inert solvents such as aliphatic, aromatic, cycloaliphatic or araliphatic hydrocarbons, for example hexane, heptane, petroleum ether, paraffin oil, hydrogenated diesel oil, hydrocarbons of the Fischer-Tropsch synthesis, cyclohexane, methyl cyclohexane, benzene, toluene, xylene, methyl naphthalene and others. Furthermore the reaction may be carried through in the presence of aliphatic, aromatic, cycloaliphatic and araliphatic simple or mixed ethers, such as diethyl ether, dibutyl ether, methyl butyl ether, phenylmethyl ether, diphenyl ether, cyclohexylmethyl ether, cyclic ethers such as dioxane, tetrahydrofurane, N-methyl morpholine; tertiary amines such as triethyl amine, endoethylene piperazine or N-methyl piperidine, these additional compounds being preferably employed in amounts of 1–5 moles per atom of calcium present in the complex compound. Another suitable additional compound is triphenyl phosphine which may be employed in amounts of 1–3 moles per atom of calcium. These additional compounds may enhance the activity of the present catalysts.

The solvents should be freed from those impurities which preferentially react in foreseeable manner with the organometallic compounds of the type described and thus lead to undesired or disturbing reaction products, that is to say, the organic calcium compounds according to the invention show a particularly high reactivity, advantageously with respect to those compounds which contain active hydrogen atoms, such as water, acids, bases, alcohols, phenols, acetylenes, etc. Such compounds should consequently be absent during production and storage.

The organic calcium compounds according to the present process can be produced within a wide temperature range, this being substantially determined by the reactivity of the starting components and also their other properties, such as melting point, etc. Many of the reactions can be conducted at room temperature, but it is also possible to work at substantially lower or higher temperatures, such as from —70° C. to +100° C. It can in many cases be advantageous to initiate the reaction at lower temperature and to complete it at higher temperature. The proportions of the two components, i.e. organic calcium halide (II) and organometallic compound (III) to be used in the present process are advantageously in the order of magnitude of equivalent quantities, (that is to say the alkaline metal compounds should be employed in such amounts that one alkaline atom is present per one halogen atom of the calcium compound), but this does not exclude the use of excesses of one or other of the components in certain cases. The alkali metal or alkaline earth metal halides which sometimes can be additionally present can comprise quantities of 0.1 to 10 mols, preferably 0.5 to 3 mols per mol of organic calcium compound.

The aforementioned catalysts may be characterized by the following general formula:

$$Me_n[Ca_nR_{1_n}R_2X_n]$$

in which Me, $R_1$, $R_2$, X and $n$ have the same meaning as above, the radial $R_2$ having a valency of $n$.

Of special interest are compounds of the above formula in which Me is lithium, $n$ is 1, $R_1$ is aryl, $R_2$ is alkyl and X is bromine or iodine.

The catalysts which are prepared in the presence of alkali metal or alkaline earth metal halides correspond to the following general formula:

$$Me_n[Ca_nR_{1_n}R_2X_n]\cdot A_m$$

in which Me, $R_1$, $R_2$, X, $n$ have the same meaning as above, A stands for an alkali or an alkaline earth metal halide, preferably lithiumchloride, lithiumbromide, lithiumiodide, calcium chloride, calcium bromide, calcium iodide and $m$ stands for an integer preferably from 0.5 to 3.

For the preparation of the organic calcium halides under consideration as starting materials, the necessary calcium is preferably used in finely divided form, it being suitable for the reactivity to be further improved by a suitable pretreatment such as initial corrosion with acids, iodine. Finely divided calcium alloys, for example those of calcium and magnesium, calcium and mercury, calcium and lithium, calcium and sodium can also be employed.

It is advantageous to stir vigorously during the reactions that is to say, both in the preparation of the starting material and also of the organic calcium compounds, especially when solid substances, such as metallic calcium, sodium phenyl, lithium phenyl or others participate in the reaction. Highspeed stirrers and intensive stirrers with a comminuting action (for example of the "Ultra Turrax" type) have proved especially suitable. The reaction is furthermore preferably allowed to take place in an inert atmosphere, such as an atmosphere of nitrogen, helium, argon.

By choice and variation of the individual components, such as the alkali metals, the hydrocarbon radicals and the halogens, as well as additional alkali or alkaline earth metal halides, it is readily possible to vary within wide limits the properties of the organic calcium compounds according to the invention, particularly the solubility and reactivity thereof. Thus, it is possible on the one hand to prepare organic calcium compounds which are substantially similar to the organic alkali metal compounds as regards their reactive behaviour, but on the other hand it is also possible to obtain organic calcium compounds of the type described which correspond in their behaviour entirely to the organometallic compounds of the second group of the periodic system.

Other active catalyst systems consist of combinations of the above recited organic calcium compounds which, if necessary and as already explained, can also contain alkali halides, with those substances which have a very large surface. Such substances and the use thereof for the production of catalyst systems are for example described in U.S. patent application Serial No. 27,988, filed May 10, 1960, now U.S. 3,072,621, and Serial No. 27,486, filed May 9, 1960, now U.S. 3,149,099.

Mentioned by way of example in this connection are: substances present in finely divided form, that is to say, in the form of powder or dust or any other highly dispersed form, such as the metals magnesium, zinc, aluminum, iron, and also metal oxides, such as magensium oxide, clcium oxide, zinc oxide, aluminum oxide, silicon dioxide, titanium dioxide, tin dioxide, zirconium dioxide, molybdenum oxide, iron oxide as well as silicates, graphite, polyvalent metal halides, such as magnesium bromide, calcium chloride, titanium-(III)-chloride, zirconium-(IV)-chloride, tin-(II)-chloride, antimony-(III)-chloride, iron-(III)-bromide, chromium-(III)-chloride, nickel-(II)-bromide. By graphite, within the terms of the present invention, are understood forms of carbon which are more fully described in A. F. Holleman and E. Wiberg: "Lehrbuch der anorganischen Chemie," 34-36th edition, Berlin, 1955, pages 296-298. As examples, there are mentioned wood charcoal, animal charcoal, blood charcoal, sugar charcoal, gas soot, lamp black, furnace black, flue black, acetylene soot, naphthalene soot, retort graphite, natural graphite. Catalysts of this type can be very satisfactorily dispersed in hydrocarbons, cause a very uniformly progressing polymerization and have, in a wide range of concentration, practically no regulating influence on the molecular weight of the polymers.

The various catalysts are especially suitable for polymerizing hydrocarbons of the butadiene series and their derivatives. Conjugated diolefines of this type are for example butadiene, 1-methyl butadiene, 2-methyl butadiene-1,3, 2,3-dimethyl butadiene-1,3, 2-ethyl butadiene-1,3,2-phenyl butadiene-1,3, and 2-chlorobutadiene. It is obvious that also mixtures of these monomers, such as butadiene and 2-methyl butadiene, can be used for the polymerization. The present process has proved excellently suitable for the polymerization of 2-methyl butadiene.

Suitable vinyl compounds which can be copolymerized with conjugated diolefines, are aromatic vinyl substances, for example styrene or styrenes which are alkylated in the nucleus or in the vinyl group, such as alpha-methyl styrene, vinyl toluene, and also halogenated styrene, these vinyl compounds being preferably applied in amounts up to about 40 percent, as calculated on the total weight of monomers applied.

The diolefines of the butadiene series to be used for the polymerization should merely be subjected beforehand to conventional known physical or chemical purifying processes, such as fractional distillation, heating with alkali metals in the presence of polymerization inhibitors and subsequent distillation, treatment with organometallic compounds, aluminium oxide, silica gel and other active adsorbents or heavy metal salts. Those compounds, which it can be foreseen would lead to deactivation of the catalyst system, should be substantially removed, especially compounds with active hydrogen atoms.

The catalyst concentration is advantageously so adjusted that about 0.001 to 1.0 part by weight of calcium is present to 100 parts by weight of monomers. As regards catalysts which contain solid substances with a large surface area, the ratio between calcium and the said large-surface area susbtances is substantially in the range from 1:10 to 1:5. The proportions can however without disadvantage be above or below these limits in cases where there are special requirements.

The polymerization is preferably conducted in the absence of atmospheric oxygen and moisture and in an inert atmosphere, such as nitrogen, helium, argon, hydrocarbon vapours and the like, and can be conducted as block polymerization or solution polymerization.

Suitable solvents and diluents are saturated hydrocarbons, such as propane, butane, pentane, hexane as well as mixtures of such hydrocarbons, such as petroleum ether, kerosene, diesel oil, paraffin oil, as well as cycloaliphatic hydrocarbons, such as cyclohexane, and aromatic hydrocarbons, such as benzene, toluene, xylene, can also be used for the same purpose.

When operating in accordance with the process of the invention, the polymerization temperature is preferably not higher than $+90°$ C. and advantageously is between $-5$ and $+60°$ C. The pressure conditions are not critical for the course of the polymerization. Atmospheric pressure can be used, but it is also possible to work under reduced or elevated pressures. The polymerization is advantageously allowed to proceed at pressures which result from the vapor pressures of the monomers and solvents used and at the reaction temperatures employed.

The polymerization of conjugated diolefines with the aid of the catalysts as described can be carried out intermittently or continuously. Suitable for intermittent operation are flasks, stirrer-type vessels and autoclaves, with which it is possible to work under inert conditions. For continuous operation, a worm-vessel has proved suitable, and it has also been found advisable to connect an initial polymerization vessel before the worm in order to keep the residence time in the actual worm element as short as possible.

The copolymerization of different diolefines, such as 2-methyl-butadiene and butadiene, can be readily carried out in the same way.

On completion of the polymerization, the polymer is obtained as a solid mass where no solvent has been used and as a viscous solution in the case where a solvent has been employed. By treatment with alcohols, acetone, alcohol/water and acetone/water mixtures, perhaps in the presence of inorganic or organic acids, the polymer can be precipitated, the reactive organic calcium compounds being simultaneously deactivated and removed. It can be advantageous during the working up to operate in the presence of stabilizers and anti-oxidants, such as phenyl-β-naphthylamine, N,N'-diphenyl-p-phenylene diamine, di-tert.-butyl-p-cresol, di-tert.-butyl-hydroquinone, tris-(nonylphenyl)-phosphite, in order to avoid an oxidation of the sensitive polymers and thus the premature degradation thereof. However, it is also possible for substances which deactivate the catalyst to be added immediately after completing the polymerization, such as for example organic acids, then to incorporate stabilizers and anti-oxidants and to remove the solvent in a suitable apparatus, for example a kneader or a worm device. The drying of the stabiilzed polymerization products can take place in air or in vacuum at normal or elevated temperatures.

In contrast to other known processes, no periods or only very short periods, of latency occur when using the catalysts according to the invention. An additional advantage of the process described herein is that the polymerization proceeds uniformly, even with relatively large batches, and can be controlled without any particular expenditure for technical equipment. The polymers prepared by the present invention can be of very high molecular weights, such as those otherwise only obtained with catalysts which, like metallic lithium, are very difficult to control during the process. It is readily possible in accordance with the process to obtain polymers with a limit viscosity of $[\eta]=6$ and higher. The gel content of these polymers is extremely low, especially with solution polymerization.

Nitrogen can be used as inert gas in the preparation of the catalysts and in the polymerization, this being a possibility which does not exist when using metallic lithium as catalyst.

The danger of lowering the molecular weights with an excessive supply of the catalyst is also considerably reduced, especially when using catalysts containing highly dispersed substances of large surface area, since the maximum concentration of catalysts based on organic calcium compounds is not nearly as critical as with the hitherto known catalytically active alkali organo-metallic compounds.

When 2-methyl-butadiene is polymerized with the catalysts according to the invention, it is possible inter alia to prepare polymers of which the monomer units, according to infra-red spectroscopic investigations, are more than 90 percent linked in the 1,4-cis-arrangement.

The polymers prepared in accordance with the present process can be worked by the conventional methods, inter alia to elastic products with good elastic properties, that is to say, they can for example be vulcanized with addition of conventional vulcanizing agents, fillers, pigments, stabilizers and age-resisters. The 2-methyl-butadiene polymers prepared in this way are of particular industrial significance, since they can be worked in known manner into vulcanizates which show the advantageous properties of natural rubber, especially a low hysteresis and a high degree of elasticity and tensile strength with a low degree of hardness.

The experiments set out below are carried out in the absence of air and moisture in a nitrogen atmosphere, the parts indicated being parts by weight.

*Example 1*

Phenyl calcium iodide is prepared from 1.2 parts by weight of calcium and 4.08 parts by weight of phenyl iodide in absolute diethyl ether. On completion of the reaction, 128 parts by weight of lithium butyl are added and the mixture is stirred for 30 minutes at 25° C. The ether is then distilled off and replaced by benzene, so that after the quantitative removal of the ether, 40 parts by volume of a benzenic solution, dark red in colour, are left, containing a small quantity of a light brown very finely divided precipitate.

3.2 parts by volume of the previously described catalyst solution are mixed with 150 parts by weight of 2-methyl-butadiene under a nitrogen atmosphere in an apparatus provided with a stirrer device, the said butadiene having been carefully purified beforehand by boiling over finely divided sodium and subsequent distillation. The mixture is then heated while stirring to 40° C. and the viscosity of the solution has already clearly increased after about 10 minutes. The polymerization proceeds smoothly and is practically completed after four hours. 143 parts by weight of a light brown viscous polymer are obtained. The polymer is thoroughly mixed in a kneader with 3 parts by weight of stearic acid and 2.25 parts by weight of tris-(nonylphenyl)-phosphite with the addition of 150 parts by weight of benzene, the polymer thereby becoming colourless. Drying takes place in vacuo at 50° C. The intrinsic viscosity of the polymer is 6.87. 93% of the monomer units of the polymer are linked in 1,4-cis-arrangement and 7% in a 3,4-arrangement, this having been shown by the infra-red spectrum.

*Example 2*

2.44 parts by weight of phenyl calcium iodide in absolute diethyl ether are mixed by stirring with an ethereal solution of 0.84 part by weight of lithium phenyl and 0.87 part by weight of lithium bromide. After adding about 50 parts by volume of toluene, the ether is distilled off quantitatively, 2.8 parts by volume of the catalyst suspension which is thereby obtained and which is deep brown in colour are introduced into 100 parts by weight of purified and dry 2-methyl-butadiene and heated to 40° C. while stirring or shaking. The viscosity of the solution has clearly increased after about 30 minutes and polymerisation is stopped after 5 hours. The tough solid mass which is obtained is introduced into a solution of 5 parts by weight of acetic acid and 3 parts by weight of phenyl-β-naphthylamine in 500 parts by volume of isopropanol. After 24 hours, the polymer is washed with cold water on a washing roller and dried at 50° C. in vacuo. 96 parts by weight of polymer are obtained with an intrinsic viscosity of $[\eta]=5.92$. 87% of the monomer units of the poly-2-methyl butadiene thereby obtained are linked in the 1,4-cis-structure and 13% in a 3,4-structure.

*Example 3*

3 parts by weight of finely divided, aluminum oxide (after drying by strong heating) are mixed under nitrogen with 20 parts by volume of the catalyst solution obtained according to Example 1 and stirred for 1 hour at 30° C. 5 parts by volume of this light brown catalyst suspension are introduced into a mixture of 100 parts by weight of 2-methyl-butadiene and 200 parts by weight of cyclohexane and stirred at 50° C. Polymerization starts after about 15 minutes and is practically completed after 6 hours. The viscous reaction product is mixed in a kneader with 2 parts by weight of stearic acid and 2 parts by weight of bis-(3-cyclohexyl-5-methyl-2-oxyphenyl)-methane and thoroughly kneaded for 1 hour. The solvent is then distilled off at a temperature of 40° C. under reduced pressure. 92 parts by weight of poly-2-methyl-butadiene with an intrinsic viscosity of $[\eta]=6.43$ are obtained.

*Example 4*

15 parts by volume of catalyst solution according to Example 1 are stirred with a suspension of 2 parts by weight of active carbon black in petroleum ether for 30 minutes at 40° C. 11.5 parts by volume of this catalyst suspension are heated with a mixture of 150 parts by weight of 2-methyl-butadiene and 100 parts by weight of benzene to 50° C. while stirring or shaking. After 4 hours, the highly viscous mass is introduced into a solution of 5 parts of stearic acid and 4 parts by weight of N,N'-diphenyl-p-phenylene diamine in 500 parts by volume of ethanol. The mixture is left standing overnight and is then washed with water on a washing roller. After drying, there are obtained 142 parts by weight of polymer with an intrinsic viscosity of $[\eta]=5.92$.

Example 5

Phenyl calcium iodide is prepared from 0.5 part by weight of calcium and 2.04 parts by weight of phenyl calcium iodide in diethyl ether, as described in Example 1. After reaction has taken place, 0.64 part by weight of lithium butyl is added. The mixture is stirred for 30 minutes at 25° C. and is then filtered with exclusion of air. The filtrate has 3 parts by weight of diphenyl ether added thereto, and then the diethyl ether is quantitatively removed under reduced pressure. The residue is washed with a little benzene and suspended in cyclohexane. 2.5 parts by volume of the catalyst thus prepared are heated with 100 parts by weight of 2-methyl-butadiene-1,3 for 6 hours and while stirring or shaking to 45° C. The solid polymerisation product, with addition of 100 parts by weight of benzene, is intimately mixed in a kneader with 3 parts by weight of stearic acid and 2 parts by weight of tris-(nonylphenyl)-phosphite. After drying, 93 parts by weight of poly-2-methyl-butadiene are obtained, 90% of which are in a 1,4-cis-structure and 10% in a 3,4-structure.

Example 6

6 parts by weight of finely powdered calcium chips, 0.5 part by weight of mercury chloride, 40 parts of toluene and 18.5 parts by weight of zinc diethyl are heated while stirring thoroughly for 5 hours to 120–125° C. Five parts by volume of the catalyst suspension thus obtained and decanted off from unreacted calcium metal are heated in a nitrogen atmosphere with 100 parts by weight of dried 2-methyl-butadiene-1,3 to 60° C. The polymerisation is stopped after 16 hours and the reaction product is worked up as described in Example 1. 87 parts by weight of poly-2-methyl-butadiene are obtained, the structure of which, as shown by the infra-red spectrum, has 87% of the monomer units in a 1,4-cis-bond and 13% in a 3,4-bond.

Example 7

9 parts by weight of finely powdered calcium chips, 9 parts by weight of mercury diphenyl, 0.075 part by weight of iodine and 105 parts by weight of absolute diethyl ether are vigorously shaken under nitrogen in a flask with the addition of glass beads. After 4 days, the reaction mixture is filtered, 75 parts by weight of toluene are added and the main quantity of the diethyl ether is removed by distillation. 22.5 parts by volume of the catalyst suspension thus prepared are introduced into 150 parts by volume of purified 2-methylbutadiene-1,3 under argon. The polymerisation, which takes place at 50° C., is completed after about 6 hours. 63 parts by weight of a solid, rubber-like polymer are obtained, 32% of which have a 3,4-structure.

The experiment is repeated with a catalyst which is carefully freed from diethyl ether residues. The 3,4-proportion of the polymer obtained in this way is still only 8.9%.

Example 8

The catalyst is prepared by the procedure described in Example 7, but the reaction is carried out in the presence of 12.75 parts by weight of sharply dried, finely powdered lithium bromide. Of the 75 parts by volume of a reddish-brown catalyst suspension which is obtained in this way, 12 parts by volume are introduced in an argon atmosphere into a mixture of 100 parts by weight of 2-methyl-butadiene-1,3 and 300 parts by weight of hexane. A highly viscous solution is formed on heating to 50° C. After 7 hours, excess isopropanol is added to this solution, the polymer precipitating. 82 parts of polymer are obtained, this having an intrinsic viscosity of $(\eta)=8.2$.

Example 9

A catalyst suspension obtained according to Example 1 is stirred with 2.5 parts by weight of triphenyl phosphine for 2 hours at 50° C., is then cooled to 10° C. and filtered with suction. The reddish-coloured precipitate is washed with a little methyl cyclohexane, dried under reduced pressure at 25° C. and finely dispersed in 30 parts by volume of benzene. 3.8 parts by volume of this dispersion are added to a mixture of 70 parts by weight of 2-methylbutadiene-1,3 and 70 parts by weight of cyclohexane and heated to 45° C. After 8 hours, the viscous reaction product is introduced into 500 parts by volume of an aqueous acetone solution containing 2% of phenyl-$\beta$-naphthylamine. After drying, 64 parts by weight of a solid rubber-like polymer are obtained. The ultra-red spectrum shows that 91.5% of the monomer units are in a 1,4-cis-bond and 8.5% thereof in a 3,4-bond.

Example 10

A polymer prepared according to Example 1 was processed to a mixture of the following composition on a rolling mill:

| | Parts |
|---|---|
| 1,4-cis-polyisoprene | 100 |
| Carbon black (inactive) | 30 |
| ZnO (active) | 5 |
| Phenyl-$\alpha$-naphthylamine | 2 |
| Paraffin | 0.6 |
| Activator (0.5 parts of dibenzothiazyl-disulphide, 0.5 parts of diphenyl-guanidine) | 0.7 |
| Sulfur | 2.5 |

The product which was vulcanized in known manner had the following properties:

| | | |
|---|---|---|
| Hardness | shore | 45° |
| Tensile strength | kg./cm.$^3$ | 153 |
| Elongation | percent | 870 |
| Rebound elasticity: | | |
| 20° C. | percent | 71 |
| 75° C. | do | 76 |

Example 11

20 parts by volume of the catalytic solution as described in Example 1 together with 1600 parts by volume of petrol ether (boiling limits 40 to 60° C.) and 360 parts by weight of butadiene-1,3 are introduced into a stirring-type autoclave under nitrogen and heated to 60° C. Polymerisation is complete after 12 hours. The light brown viscous polymer solution is mixed by means of a kneader with 5 parts by weight of phenyl-$\beta$-naphthyl amine and 3 parts by weight of stearic acid. The polymer solution which is now colorless is dried at 50° C. There are obtained 342 parts by weight of polybutadiene having an intrinsic viscosity of 2.3.

Example 12

5 parts by volume of the catalytic solution as described in Example 1 are introduced under nitrogen into a stirrer-type vessel provided with a reflux-cooler together with 70 parts by weight of freshly distilled 2-methylbutadiene-1,3 and 30 parts by weight of freshly distilled styrene and 100 parts by weight of petrol ether (boiling limits 30 to 75° C.) and heated to 60° C. Polymerisation starts after about 10 minutes as can be noticed from the distinct increase in viscosity of the solution. Polymerisation is complete after 6 hours. The polymer solution is mixed with 1.25 parts of phenyl-$\beta$-naphthyl amine and 2 parts by weight of stearic acid in a kneader. After subsequent drying at 50° C. in vacuo there are obtained 91 parts by weight of a yellow coloured polymer having an intrinsic viscosity of 3.9. The copolymer according to the UV-spectrum contains 28% of styrene. 92% of the isoprene units are in 1,4-bond.

Example 13

5 parts by volume of the catalytic suspension as described in Example 1 are introduced into a stirrer-type autoclave which has been rinsed with nitrogen together with 100 parts by weight of petrol ether, 50 parts by weight of butadiene-1,3 and 50 parts by weight of 2-methyl-butadiene-1,3. The reaction mixture is heated to 60° C. After 10 hours the highly viscous polymer solution is let out of the autoclave and mixed with 1.25 parts by weight of phenyl-β-naphthyl amine and 3 parts by weight of stearic acid. After drying at 50° C. there are obtained 93 parts by weight of a yellowish polymer having an intrinsic viscosity of 3.1.

Example 14

100 parts of hexane and 50 parts by weight of styrene are introduced under argon into a pressure flask. By heating in a sand-bath part of the solution medium is evaporated in order to remove remaining air. Thereafter 2 parts by volume of the catalytic suspension described in Example 1 are added. Polymerisation is carried through at 50° C. After 8 hours the reaction mixture is poured into ethanol. The resulting greyish-brown coagulate is dissolved in xylene and precipitated by addition of methanol. There are obtained 42 parts by weight of a purely white brittle polymer.

Example 15

200 parts by weight of petrol ether and 100 parts by weight of acrylic acid methyl ether are cooled to −45° C. in a glass-flask which has been freed from air and moisture by repeated evacuation and rinsing with argon and which is provided with a stirrer. Thereafter 6 parts by volume of a catalytic suspension according to Example 1 are added dropwise. Polymerisation is interrupted after 12 hours. The reaction mixture is mixed with methanol. There are obtained 7 parts of a rubber-like polymer.

The following examples nearer illustrate the preparation of the present catalysts.

Example 16

4.8 parts by weight of calcium chips are reacted in diethyl ether with 16.3 parts by weight of phenyl iodide. A solution of 5.12 parts by weight of lithium butyl in cyclohexane is then added to the light brown suspension. A deep reddish-brown solution is thereby formed, which can easily be separated from excess calcium. After adding toluene, first of all the ether and thereafter half of the added toluene are distilled off under reduced pressure. Methyl cyclohexane is then slowly added dropwise while stirring, a light brown precipitate being formed. This precipitate is suction-filtered, washed several times with methyl cyclohexane and dried. The filtrate contains only traces of iodine and organometallic compound. After drying in vacuo, 24 parts by weight of a light grey substance are obtained, and analysis of this shows a content of 41% of iodine and 13% of calcium. The acid consumption in the hydrolysis is 6.48 parts by volume of normal hydrochloric acid for 1 part by weight of substance. The compound is soluble in ethers, aromatic hydrocarbons and tertiary amines. The compounds corresponds to the formula:

$$Li[ICa(C_6H_5)(C_4H_9)]$$

Example 17

An ethereal suspension of phenyl calcium iodide is prepared, as described in Example 1, from 4.8 parts by weight of calcium and 16.3 parts by weight of phenyl iodide, and an ethereal solution of 9.5 parts by weight of lithium phenyl and 9.2 parts by weight of lithium bromide is added thereto. The deep red solution is separated from excess calcium, toluene is added while stirring, the precipitate is suction filtered after a few hours and thereafter washed with toluene. After drying, 13.2 parts by weight of a light brown substance which is readily soluble in ether is obtained, the substance containing 39% of iodine and 12.2% of calcium. 6.1 parts by volume of normal hydrochloric acid are used for 1 part by weight of substance in the hydrolysis.

The compound corresponds to the formula:

$$Li[ICa(C_6H_5)_2]$$

The still reddish-coloured filtrate is concentrated and methyl cyclohexane is added thereto until a precipitate is formed. This is suction-filtered and dried. Analysis shows 1.98 m.mol of calcium, 9.95 m.mol of halogen and and acid consumption of 3.6 ml. of normal hydrochloric acid during hydrolysis of 1 part by weight of substance. The compound is soluble in ethers, tertiary amines and aromatic hydrocarbons.

The compound corresponds to the formula:

$$Li[ICa(C_6H_5)_n] \cdot 2LiBr$$

Example 18

10 parts of calcium chips are reacted in 100 parts of ether with 46 parts of n-butyl iodide. The mixture is stirred with an efficiently working sharp-edged steel-stirrer. After the reaction has started, the temperature should not rise above 30 to 35° C. Reaction is complete after 10 hours. The white precipitate formed during reaction contains besides calcium iodide 22 parts of n-butyl calcium iodide.

After addition of 150 parts of ether and 7.55 parts of lithium butyl, the mixture is stirred at room temperature for one hour, the precipitate sucked off, the filtrate treated with toluene and the ether removed in vacuo. By addition of methyl cyclohexane there can be obtained from the toluene solution a light brown precipitate of the composition $Li[ICa(C_4H_9)_2]$ which on precipitating from ether/n-hexane does not change its composition and which—if left standing for some time—precipitates from concentrated toluene solution in crystallized form.

Example 19

In order to obtain n-butyl calcium iodide the process of Example 3 is carried through. After addition of 13.45 parts of o-methoxy-phenyl lithium in 230 parts of ether the procedure is according to Example 3. The yellow-brown precipitate obtained from the toluene solution by addition of methyl cyclohexane has—even after repeated precipitation—the composition $$Li[ICa(X_6H_4)(C_6H_4OCH_3)]$$

Example 20

4.8 parts of calcium chips are treated with 16.3 parts of phenyl iodide in diethyl ether. By filtration and careful washing with ether the non-precipitated metal and a small amount of calcium iodide are separated. The content of phenyl calcium iodide in the filtrate is titrimetrically determined and the filtrate treated with an equimolar amount of lithium dodecyl. After addition of toluene, ether is removed in vacuo at 10° C. After addition of n-hexane on cooling to −70° C. a light brown precipitate of the composition $$Li[ICa(C_6H_5)(C_{12}H_{25})]$$

is obtained which on recrystallizing from toluene or hexane does not change its composition.

We claim:
1. A calcium-containing catalyst compound of the formula:

$$Me_n[Ca_nR_{1n}R_2X_n] \cdot A_m$$

wherein Me is a metal selected from the group consisting of lithium, sodium and potassium, $R_1$ and $R_2$ are selected from the group consisting of an alkyl having 4–12 carbon atoms, phenyl and phenoxymethyl, X is iodine, A is selected from the group consisting of an alkali metal halide and an alkaline earth metal halide, and wherein $n$ is 1, and $m$ is an integer from 0 to 3.

2. A calcium-containing catalyst compound of the formula:

$$Li[CaR_1R_2I] \cdot A_m$$

wherein $R_1$ and $R_2$ are selected from the group consisting of an alkyl having 4–12 carbon atoms, phenyl and phenoxymethyl, A is selected from the group consisting of lithium chloride and calcium chloride, and $m$ is an integer from 0 to 2.

3. A calcium-containing catalyst compound of the formula:

$$Li[Ca(C_6H_5)(C_4H_9)I]$$

4. A calcium-containing catalyst compound of the formula:

$$Li[Ca(C_6H_5)_2I]$$

5. A calcium-containing catalyst compound of the formula:

$$Li[Ca(C_4H_9)_2I]$$

6. A calcium-containing catalyst compound of the formula:

$$Li[Ca(C_6H_5)(C_6H_4-OCH_3)I]$$

7. A calcium-containing catalyst compound of the formula:

$$Li[Ca(C_6H_5)_2I] \cdot 2LiBr$$

8. A calcium-containing catalyst compound of the formula:

$$Li[Ca(C_{65}H_5)(C_{12}H_{26})I]$$

References Cited by the Examiner
FOREIGN PATENTS
821,107    9/1959    Great Britain.

LEON ZITVER, *Primary Examiner.*

JOSEPH L. SCHOFER, *Examiner.*

C. R. REAP, B. HELFIN, *Assistant Examiners.*